(12) United States Patent
Miyagawa

(10) Patent No.: US 6,758,752 B1
(45) Date of Patent: Jul. 6, 2004

(54) RECORDING MEDIUM HAVING PROGRAMS TO DISPLAY FRAMES STORED THEREIN, GAME DISPLAY METHOD FOR EXECUTING FRAME-BY-FRAME DISPLAY, AND GAME DISPLAYING APPARATUS

(75) Inventor: Yoshiyuki Miyagawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 193 days.

(21) Appl. No.: 09/580,571

(22) Filed: May 30, 2000

(30) Foreign Application Priority Data

Nov. 17, 1999 (JP) .......................................... 11-327550

(51) Int. Cl.[7] .................................................. A63F 9/24
(52) U.S. Cl. ........................... 463/31; 345/213; 345/545
(58) Field of Search ............................ 463/31; 345/213, 345/545

(56) References Cited

U.S. PATENT DOCUMENTS

| | | | | |
|---|---|---|---|---|
| 4,026,555 A | * | 5/1977 | Kirschner et al. | 345/168 |
| 4,296,930 A | * | 10/1981 | Frederiksen | 345/682 |
| 5,347,322 A | * | 9/1994 | Levine et al. | 348/718 |
| 5,771,167 A | * | 6/1998 | Gomi et al. | 345/419 |
| 6,054,980 A | * | 4/2000 | Eglit | 345/204 |
| 6,364,770 B1 | * | 4/2002 | Maruyama | 345/629 |
| 6,400,361 B2 | * | 6/2002 | Toffolo | 345/213 |

FOREIGN PATENT DOCUMENTS

| | | |
|---|---|---|
| JP | 8-276074 | 10/1996 |
| JP | 10293566 | 11/1998 |
| JP | 10307905 | 11/1998 |

OTHER PUBLICATIONS

English Language Abstract of JP 10–307905.
English Language Abstract of JP 8–276074.
English Language Abstract of JP 10–293566.

* cited by examiner

*Primary Examiner*—Jessica Harrison
*Assistant Examiner*—Corbett B. Coburn
(74) *Attorney, Agent, or Firm*—Greenblum & Bernstein, P.L.C.

(57) ABSTRACT

Display change cycle of images having a different processing load is coincident with the load. After completion of the generation of a frame image, the generation of a vertical synchronization signal is awaited, and a frame buffer is changed. In synchronization with the change of the frame buffer, the generation of a next frame image is started. A generation time of the immediately preceding frame image is measured using one frame cycle as a unit. The measured value is used as a predicted value of the generation time of a frame image to be generated. The measured value is thus determined as it is as a value of the game progression degree that the next frame image should have. When the game flows have been determined, respective polygons constituting each of a group of objects constituting the next frame image are calculated with respect to the position and orientation after lapse of the frame period corresponding to the number of the game progression degree value. Based on the calculation results, image data representing the figures that shows the respective polygons are stored in the frame buffer.

18 Claims, 9 Drawing Sheets

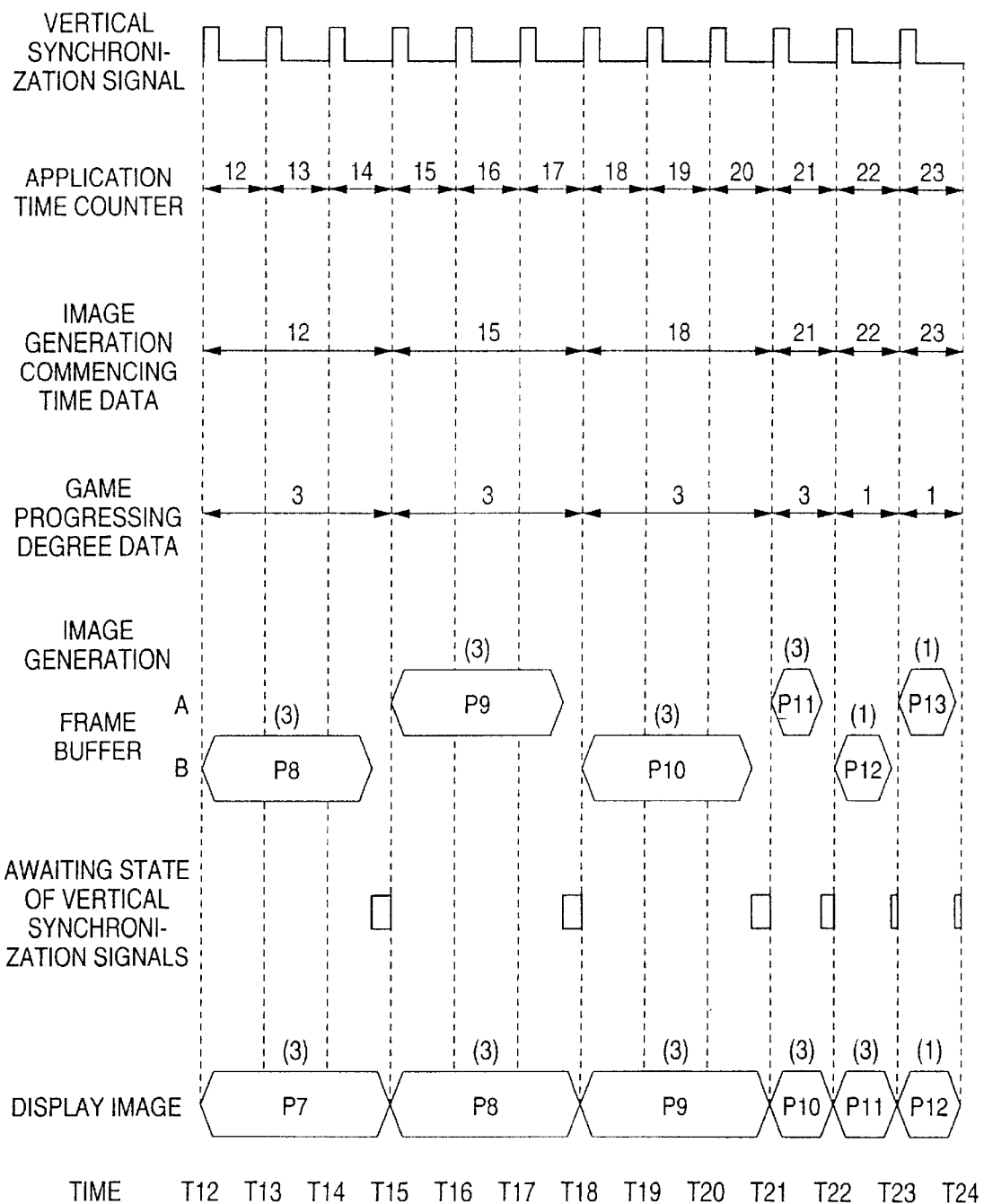

RECORDING MEDIUM HAVING PROGRAMS TO DISPLAY FRAMES STORED THEREIN, GAME DISPLAY METHOD FOR EXECUTING FRAME-BY-FRAME DISPLAY, AND GAME DISPLAYING APPARATUS

CROSS REFERENCE TO RELATED APPLICATION

The present disclosure relates to subject matter contained in Japanese Patent Application No. HEI 11-327550, filed on Nov. 17, 1999, the disclosure of which is expressly incorporated herein by reference in its entirety.

BACKGROUND OF THE INVENTION

1. Field of the Invention

The present invention relates to a recording medium having programs for generating and displaying game images stored therein, a game display method and a game apparatus.

2. Description of Background Information

Recently, video games have been developed, utilizing advanced technologies. In the video games, objects to be displayed, such as people, machines, tools, buildings, backgrounds, etc., (hereinafter, referred to as "objects") are arrayed or disposed in line with the progress of a game in a three-dimensional virtual reality space. Images expressing the respective arrayed objects are generated and displayed on the display screen.

In a video game, image generating processes are repeated multiple times a second, wherein still images consisting of multiple frames are generated in a second (hereinafter, called "frame image"). It is ideal that the generated frame images are displayed one after another on the display screen in a frame image display cycle (hereinafter, called a "frame cycle") which is the shortest cycle of frame-by-frame display changes.

In order to execute display in a frame cycle, it is necessary that the respective frame images are generated in one frame cycle. However, in a case where there are a number of objects to be displayed, the processing load in the frame image generation will be increased. As a result, there arises a case where a frame image cannot be generated in one frame cycle, depending upon the contents of the frame image. If the frame image cannot be generated within one frame cycle, object blinking may occur.

Therefore, it is an object of the invention to provide a game display method, a game apparatus, and recording medium which are suitable for displaying clear images even though the generation processing load is increased.

SUMMARY OF THE INVENTION

In order to solve the abovementioned problems, a game display method according to the invention comprises a game displaying method for executing frame-by-frame display in synchronization with reference signals generated at a fixed cycle, which includes the steps of judging a processing load in response to an operating input; adjusting a synchronization timing between the reference signals generated at said fixed cycle and the frame-by-frame display in response to a processing load judged by said judging step; and executing frame-by-frame display at said synchronization timing adjusted in said adjusting step.

According the game display method of the invention, it is possible to adjust the changeover cycle of frame images in compliance with a processing load.

In detail, the executing step generates images to be frame-displayed, at a synchronized timing adjusted by the adjusting step, and the executing step omits generation of images to be frame-displayed on the basis of the corresponding reference signal for which no synchronization timing is secured by the adjusting step.

Another preferred embodiment of a game display method according to the invention is a game display method which includes generating a plurality of frame images constituting a video game one after another; displaying a plurality of frame images generated by said generating step by changing over said plurality of frame images; predicting the time of generation of the corresponding frame image when said plurality of frame images are, respectively, generated by said generating step; and determining the game progressing degree to be advanced by the corresponding frame image, depending on the time of generation of the corresponding frame image predicted by said predicting step.

According to the game display method of the invention, when the game progressing degree of the respective frame images can be determined based on the predicted values of the varying generation times, a highly recommended game progression rate is possible.

Still another preferred embodiment of the game display method of the invention is a game display method which includes sequentially generating a plurality of frame images constituting a video game; displaying a plurality of frame images generated by said generating step by changing over said plurality of frame images; measuring the time of generation of the corresponding immediately preceding frame image when the respective immediately preceding frame images of said plurality of frame images are generated by said generating step; and determining the game progressing degree to be advanced by the corresponding frame image, depending on the time of generation of the immediately preceding frame image of the corresponding frame images, which is measured by said measuring step when the respective plurality of frame images are generated by said generating step.

Further, another preferred embodiment of the game display method of the invention is a game display method which includes sequentially generating a plurality of frame images, which constitute a video game in synchronization with the completion of generation of frame images preceding the respective frame images; displaying a plurality of frame images generated by said generating step so that said plurality of generated frame images are changed over and displayed in synchronization with appointed clock signals having a frame image display cycle being the minimum duration of display changeover of said plurality of frame images after the completion of generation of said plurality of frame images; predicting the time of generation of the corresponding frame image when said plurality of respective frame images are generated; and determining the game progressing degree to be advanced by the corresponding frame image, depending on the time of generation of the corresponding predicted frame image.

A recording medium according to the invention is a recording medium readable by a computer, in which programs execute frame-by-frame display in synchronization with reference signals generated in a fixed cycle. The programs cause said computer to judge a processing load in response to an operation input; to adjust a synchronization timing between the reference signals generate at a fixed cycle and frame-by-frame display in response to said judged processing load; and to execute frame-by-frame display at said adjusted synchronization timing.

According to the recording medium of the invention, it is possible to obtain a recording medium which is provided with stored programs capable of adjusting a changeover cycle of frame images in compliance with a processing load.

In further detail, the frame-by-frame display execution generates an image to be frame-displayed at said adjusted synchronization timing, and omits generation of an image to be frame-displayed by said corresponding reference signal if any reference signal for which no synchronization timing is secured exists.

Another preferred embodiment of the recording medium according to the invention is a recording medium readable by a computer, in which programs for a video game executed by said computer are stored, wherein said programs cause said computer to generate a plurality of frame images one after another, which constitute a video game; to display said generated plurality of frame images by changing the same; to predict the time of generation of the corresponding frame images when said plurality of frame images are, respectively, generated; and to determine the degree of progress to be advanced by said corresponding frame images, depending on the time of generation of the predicted corresponding frame images.

In further detail, for prediction of the generation time, the generation time of the corresponding frame images expressed by using a frame image display cycle being the minimum duration of changeover of display of said frame images, which are displayed, as the unit is predicted as the generation time of said frame images.

Still another preferred embodiment of the recording medium according to the invention is a recording medium readable by a computer, in which programs for a video game executed by said computer are stored. The programs cause said computer to generate frame images constituting a video game one after another; to display said generated frame images by changing the same; to measure the time of generation of the immediately preceding frame image when the preceding frame images are generated, and to determine the degree of progress of a game to be advanced by the corresponding game, depending on the time of generation of said measured immediately preceding frame image of the corresponding frame images when said frame images are, respectively, generated.

Further another preferred embodiment of the recording medium according to the invention is a recording medium readable by a computer, in which programs for a video game executed by said computer are stored. The programs cause said computer to generate frame images constituting a video game one after another in synchronization with the completion of generation of the frame image preceding the respective frame images; to display said generated frame images so as to change over and display said generated frame images in synchronization with appointed clock signals having a frame image display cycle being the minimum duration of display changeover of said frame images after the completion of generation of each of said frame images; to predict the time of generation of the corresponding frame images when said frame images are generated; and to determine the degree of progress of a game to be advanced by the corresponding frame images, depending on the time of generation of said corresponding frame images predicted by said predicting step.

In further detail, in generation of frame images, a next frame image is generated in synchronization with said clock signal after the completion of each of said frame images.

A game apparatus according to the invention is a game apparatus for executing frame-by-frame display in synchronization with a reference signal generated at a fixed cycle. The apparatus is provided with means for judging a processing load in response to an operating input; means for adjusting the synchronization timing with the reference signal generated at a fixed cycle and frame-by-frame display, in response to the processing load judged by said judging means; and means for executing frame-by-frame display at the adjusted synchronized timing.

In further detail, said executing means generates an image to be frame-displayed at the adjusted synchronized timing. Also, the executing means omits generation of an image to be frame-displayed by said reference signal where there is a reference signal for which the synchronization timing is not secured by said adjusting means.

Further, another preferred embodiment of the game apparatus according to the invention is a game apparatus, which is provided with means for generating frame images which constitute a video game one after another in synchronization with the completion of generation of frame images preceding the respective frame images; means for displaying said generated frame images so that said generated frame images are changed over and displayed in synchronization with appointed clock signals having a frame image display cycle being the minimum duration of display changeover of said frame images after the completion of generation of each of said frame images by said generating means; means for predicting the time of generation of the corresponding frame image when said plurality of frame images are respectively generated; and means for determining the game progressing degree to be advanced by the corresponding frame image, depending on the time of generation of the corresponding frame image predicted by said predicting means.

According to the invention, it is possible to adjust the changeover cycle of frame images on the basis of a processing load of a video game.

BRIEF DESCRIPTION OF THE DRAWINGS

FIG. 9 is a rear half section of the timing chart;

DETAILED DESCRIPTION OF THE PREFERRED EMBODIMENTS

Hereinafter, a description is given of some embodiments of a game display method, a program recording medium and a game display apparatus according to the invention, with reference to the accompanying drawings.

Embodiment 1

Figure 1:
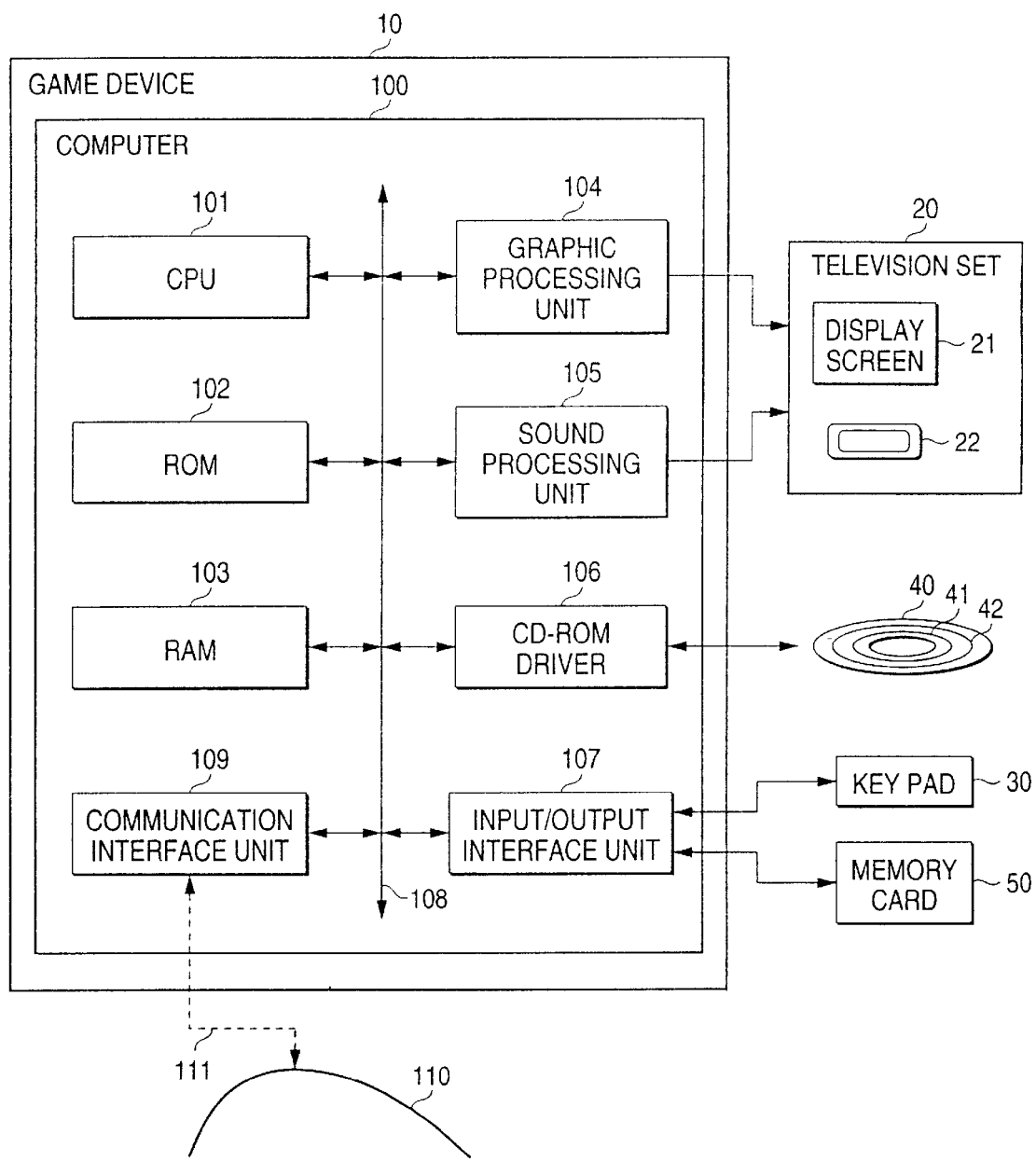
FIG. 1 is an outline showing a game system according to the present invention, in which a game apparatus having a computer incorporated therein is used.

As shown in FIG. 1, a game system 1 comprises, for example, a game apparatus 10 to which a CD-ROM (Compact Disk Read-Only-Memory) 40 having a computer program 41 according to the invention stored therein is detachably attached, display device 20 and an input device 30 operable by a player. The game apparatus 10 is a game apparatus for household use, which includes a computer 100 accommodated in a casing. A player presses an opening and closing button (not illustrated) on the game apparatus 10 to open an openable cover (not illustrated), and insert, for example, a CD-ROM 40 thereinto. The game apparatus 10 will execute a computer game program stored in the CD-ROM 40, wherein the display device 20 and input device 30 are connected to the game apparatus 10 by a cable.

The game apparatus 10 has a card slot (not illustrated). A memory card 50 being an external auxiliary recording medium can be inserted into the card slot. When the player stops a game midway, data necessary to re-start the game such as data pertaining to the player's character and enemy's character or data pertaining to the state of progression of the game program are stored in the memory card 50 inserted into the card slot. Thereafter, as the player re-starts the game using the memory card 50, the game apparatus 10 can re-start the game from the discontinued portion.

The display device 20 receives video signals and acoustic signals from the game apparatus 10. The display device 20 processes the received video signals and displays pictures on the display screen 21. Further, the display device 20 outputs sounds based on the received acoustic signals through a speaker 22 attached thereto. The display device 20 is composed of, for example, a television set.

The input device 30 is generally called a "controller", and is provided with a plurality of buttons to be operated by a player, and other operating portions (not illustrated). For example, there is a group of four direction keys which move the cursor displayed on the display screen 21 leftward, rightward, upward or downward, a selector button, a start button, or the first, second, third and fourth buttons. The game system to which the present invention is applied is not limited to those illustrated or even to systems similar to the illustrated systems.

A computer 100 comprises, for example, a central processing unit (CPU) 101, a read-only-memory (ROM) 102 which stores instruction rows and data necessary for the CPU 101 to execute program instructions, a random access memory (RAM) 103 which temporarily stores a game program to be executed, data used by the game program, and which is constituted of a main memory, a graphic processing unit 104, a sound processing unit 105, a CD-ROM driver 106 in which a CD-ROM 40 is incorporated, an input/output interface unit 107, a communication interface unit 109, and a bus 108 for connecting the above-mentioned circuits.

The CPU 101 deciphers and executes a program instruction stored in the RAM 103, controls the respective circuits in the computer in compliance with the instructions, and controls execution of the game program so that a program portion corresponding to an operation input, which is input from the input device 30 via the input/output interface unit 107, is executed in response to the operation input made by a player. The CPU 101 adequately executes instruction rows stored in the ROM 102 when executing the program instructions.

The graphic processing unit 104 includes a video RAM (VRAM) (not illustrated), and constitutes a frame buffer (not illustrated) therein. In response to the instructions given by the CPU 101, the graphic processing unit 104 depicts an image consisting of polygons expressing an object on the frame buffer (not illustrated). Also, the graphic processing unit 104 generates video signals, for example, television signals responsive to image information stored in the frame buffer, and outputs the video signals to a video circuit (not illustrated) in the display device 20.

The frame buffer comprises a pair of frame buffers (A and B) (not illustrated), and an image of a plurality of objects which constitute the same frame image is stored in one (A) of the pair of frame buffers. After generation of one of the frame images is completed, the next frame image is stored in the other (B) of the pair of frame buffers. Thus, a plurality of frame images are alternately stored in the pair of frame buffers.

The frame image last stored in one frame buffer differing from the other frame buffer which is now storing the current frame image, in the pair of frame buffers, is read therefrom. A changeover of the frame buffer from which a frame image to be read is carried out in synchronization with a vertical synchronization signal of the display device 20, and generation of a new frame image is carried out in synchronization with the signal. The cycle of the vertical synchronization signal is a frame image displaying cycle (or the frame cycle).

The sound processing unit 105 generates sound signals expressing music and effect sounds, etc., on the basis of musical sound stored in the RAM 103, and supplies the signals to the speaker 22 via an audio circuit (not illustrated) in the display device 20.

The input/output interface unit 107 is connected to the input device 30 and the memory card 50 inserted into the card slot (not illustrated), and controls a timing of data transfer between these parts and the CPU 101 or other circuits. Also, it is needless to say that the computer which constitutes the game apparatus according to the invention is not limited to that illustrated or other apparatus similar to the illustrated apparatus.

The CD-ROM 40 comprises a recording medium which stores game programs 41 and data 42 used by the game programs 41. The CD-ROM driver 106 reads the game programs 41 along with the data and stores them in the RAM 103, wherein they are supplied for execution by the CPU 101. The game programs 41 and data 42 used in the game apparatus may be proposed by other methods. For example, a method may be employed, in which the game programs 41 are included in carrier waves used for communications, transmitted and received as computer data signals to be executed by the computer.

For example, game programs are down-loaded from another device (not illustrated) in a network 110 to which the game apparatus 10 is connected via a communication line 111 by the communication interface unit 109, to be used in the apparatus 10. Also, the above game programs and data are stored in advance in another device in the network 110 to which the game apparatus 10 is connected by the communication line 111, wherein the game programs and data may be stored one after another, as necessary, in the RAM 103 via the communication line 111 and may be used thereby. Further, a game apparatus 10 may be constructed to support either one of such a pattern of use or CD-ROM.

The abovementioned game programs are executed while adequately using other circuits in the computer 100 by the CPU 101, whereby various features or functions intended by the game programs are achieved. As will be made clear in the following description, these features include a feature for generating a frame image, a feature for supplying the generated frame image to a display device by adjusting the timing and for displaying the frame image, and a feature for determining the game progressing degree between game images, etc.

Figure 2:
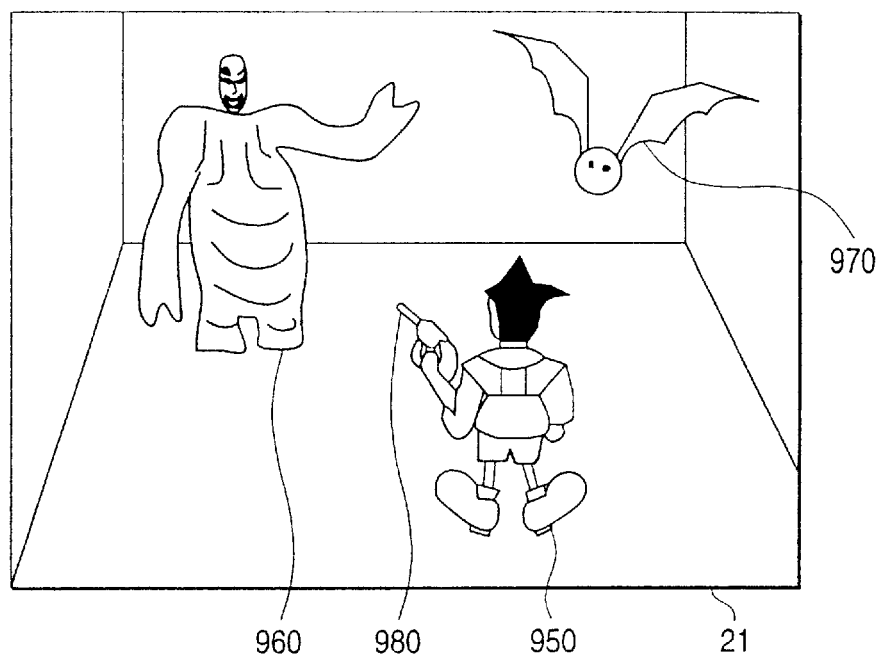
FIG. 2 is an exemplary view showing one game image which is displayed by a game program executed by a game apparatus.

FIG. 2 is an exemplary view showing one of the game images displayed by the game programs executed by the game apparatus. In the drawing, a player's character 950 positioned in a three-dimensional virtual reality space and enemy characters 960 and 970 are displayed in a display screen 21 as one of frame images belonging to one battle scene. The enemy character 960 lifts his big left hand to intend to hit the player's character 950. The enemy character 970 is going to attack the player's character 950 from the sky. The player's character 950 is going to make a counter-attack using a gun 980.

Operating the input device 30 (FIG. 1), the player can control the behaviors of the player's character 950, whereby the motions of the player's character 950 can be changed. When the movement of the player's character 950 is instructed by the player, the position of the player's character 950 is then accordingly changed on the display screen.

When displaying the image, the image expressing the respective characters is operated based on a plurality of polygons. In order to make the game images on the screen more realistic, it is highly desired that the number of polygons is increased. Although in the drawing the illustration is simplified, the background includes many things, and they are displayed by using more polygons. For example, complicated indoor structures such as a staircase and other indoor interiors, may be displayed, including the emergence of smoke as the game progresses.

Therefore, in order to generate a frame image including a number of objects and complicated background objects as shown in FIG. 2, the CPU 101 will need enough time to process them. In particular, in order to display the characters more realistically than the other structures, the characters will be displayed, using more polygons than of the other objects. Therefore, in order to generate a frame image including more characters as shown in FIG. 2, one frame cycle is insufficient, wherein, for example, three frame cycles are required.

Figure 3:
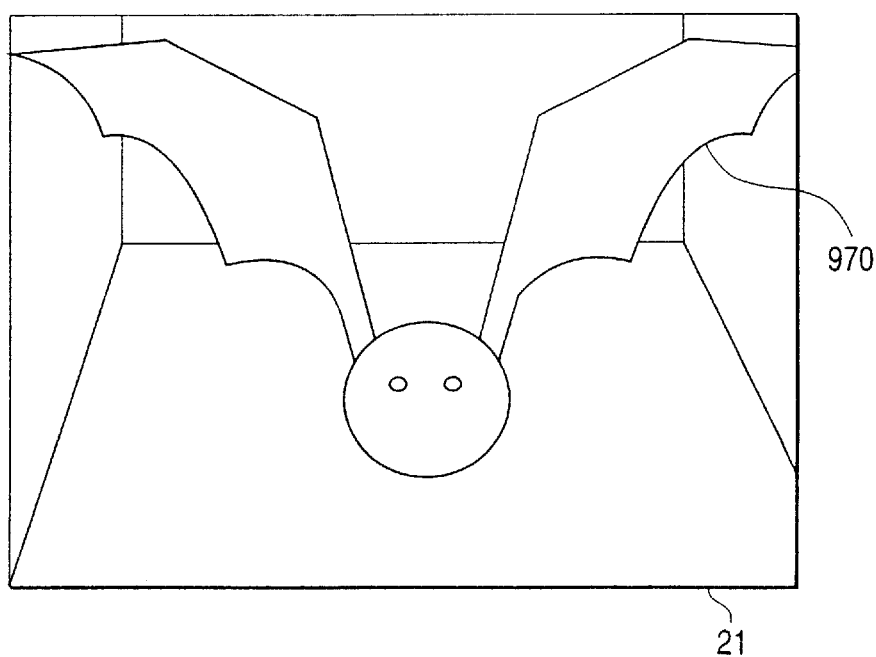
FIG. 3 is an exemplary view showing another game image displayed by the game program.

FIG. 3 is an example of another game image displayed in the same battle scene in the same game program as in FIG. 2. Herein, although the enemy character 970 is displayed enlarged, no other character is displayed. In the case of this image, the number of characters displayed is only one, and so the background image is made simple. Also, to simplify the drawing, the background image is omitted in the drawing. In the case of the game image, the number of displayed objects is small, and in particular, the number of character is small. Therefore, the game image can be generated in one frame cycle.

Where the number of objects included in different frame images included in the same scene of a video game, particularly, the number of characters differs, the time required to generate these frame images will become one frame cycle, or twice or three times as many frame cycles.

Also, in the video game, a game progresses in response to operation inputs made by a player. That is, the frame image to be displayed is determined in response to the operation input made by the player.

In the display device 20 (FIG. 1), after a frame image is newly generated, the new frame image is displayed in synchronization with a vertical synchronization signal. If several frame cycles are required to generate the new frame image, the immediately preceding generated frame image is repeatedly displayed in the period of several frame cycles.

In the present invention, the game progressing degree of these frame images is determined, when generating those frame images, so that the progressing rate of the game on the display screen becomes as required even though the time of generation of frame image changes in the respective frames as in these frame images.

Figure 4:
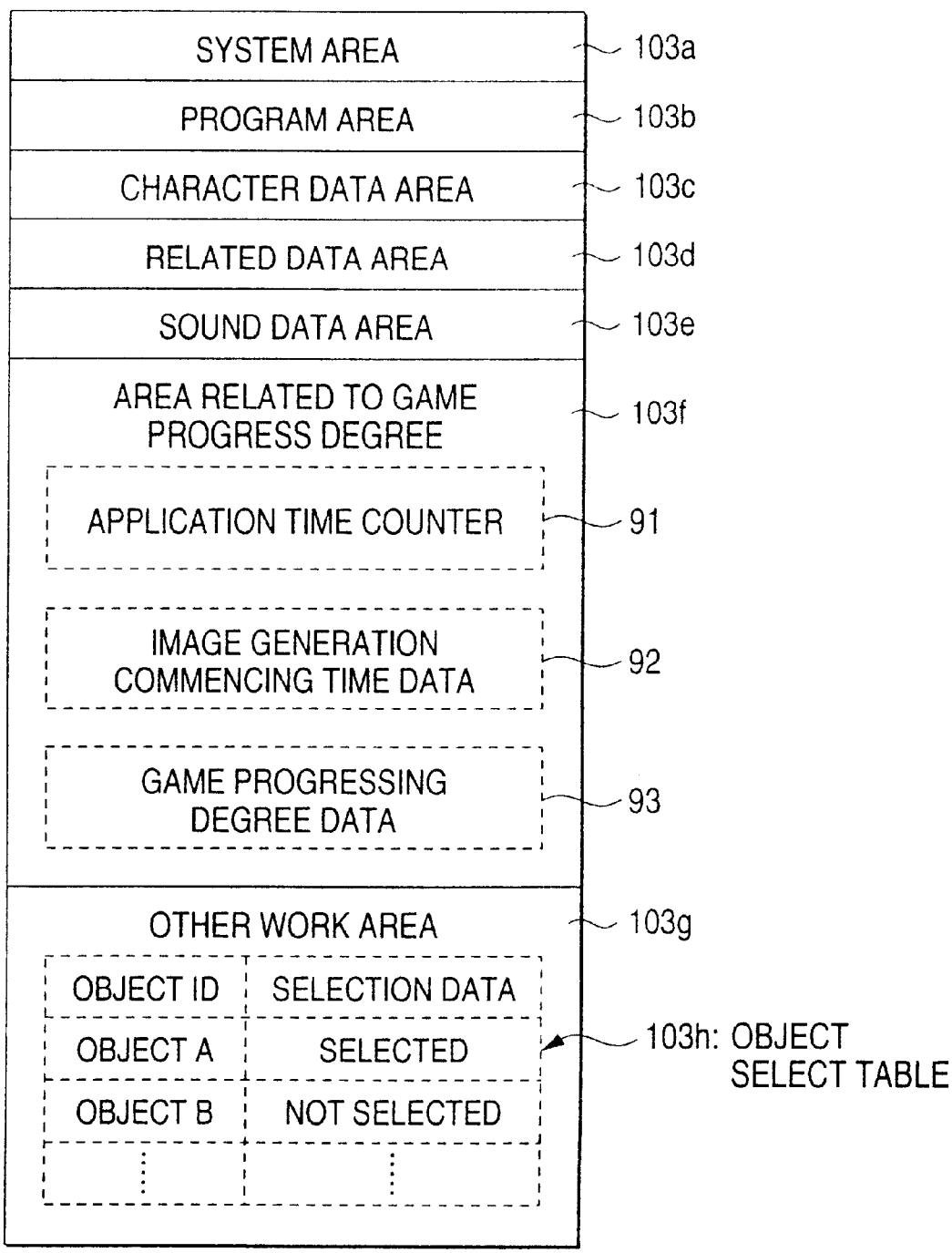
FIG. 4 shows an example of a RAM memory map in a computer contained in the game apparatus.

The RAM 103 is used on the basis of a memory map shown in, for example, FIG. 4 when executing a game program. System information such as an interruption vector showing a jumping address to an interruption handling routine is stored in a system area 103a. A portion that is being executed by the game program is stored in the program area 103b. Data pertaining to a plurality of characters that appear in the game, such as the player's character 950, enemy characters 960, etc., are stored in a character data area 103c.

The related data area 103d stores other related data used for execution of the game program. For example, motion data of the respective characters are stored therein. But, since the related data does not pertain directly to the present invention, description thereof is omitted herein. A sound data area 103e stores data to generate sounds in execution of the game.

The data area 103f related to the game progressing degree stores data to execute a game display method according to the invention. For example, a real time counter 91, data 92 of image generation commencement time, and data 93 on the game progressing degree are stored therein.

The real time counter 91 displays a real time of the game progress. In the preferred embodiment, as described later, the real time is displayed in terms of the number of vertical synchronization signals generated by the graphic processing unit 104 (FIG. 1). That is, the real time counter 91 displays the real time in terms of frame cycles. Or the real time counter 91 expresses the ratio of the real time to the frame cycles. The counter 91 increments by one whenever a vertical synchronization signal is generated.

The data 92 of image generation commencement time express the time to commence generation of a frame image. In the preferred embodiment, the time is also expressed in terms of the number of vertical synchronization signals. In the embodiment, generation of frame images is commenced in synchronization with the generation of vertical synchronization signals. Therefore, the data 92 of image generation commencement time expresses to which vertical synchronization signal from the commencement the actual generation time of the frame image corresponds.

The data 93 on the game progressing degree are characteristic data of the present embodiment, which expresses the game progressing degree which the frame image to be generated must have with respect to the immediately preceding frame image. In the present embodiment, the game progressing degree 93 is determined so that it expresses to which times the game progressing degree in one estimated frame cycle corresponds. The game program estimates the frame cycle based upon the frame image at that time the game progressing degree (an amount of change of the game image in line with the game progress) which the frame image to be generated must have.

Although the real time counter 91 and data 92 of image generation commencement time can be expressed in terms of other time units, for example, seconds, the time of generation of frame images can be obtained, as described later in the present embodiment, by differences between the real time counter 91 and the data 92 of image generation commencement time, if such a method is employed to express the data by using the cycle of generation of the vertical synchronization signals as a unit. And, it is advantageous that the difference can be used as the data 93 on the game progressing degree.

Another work area 103g can be used as a work area for temporarily retaining other data during execution of the game programs. For example, an object selection table 103h is stored therein.

In the object selection table 103h, a column of "Object ID (Identification)" and a column of "Selection Data" are provided. An object identifier (ID) which becomes the object of the display is stored in the "Object ID" column, and data in the "Selection Data" column are caused to correspond to the respective object Ids. In the "Selection Data" column, selection data are stored, which shows whether or not the corresponding object is selected in the object motion calculation process described later. If the data in the "Selection Data" of the object has been "Selected", the object is an object which has been already selected. If "Not Selected", the object is an object which has not been selected.

Figure 5:
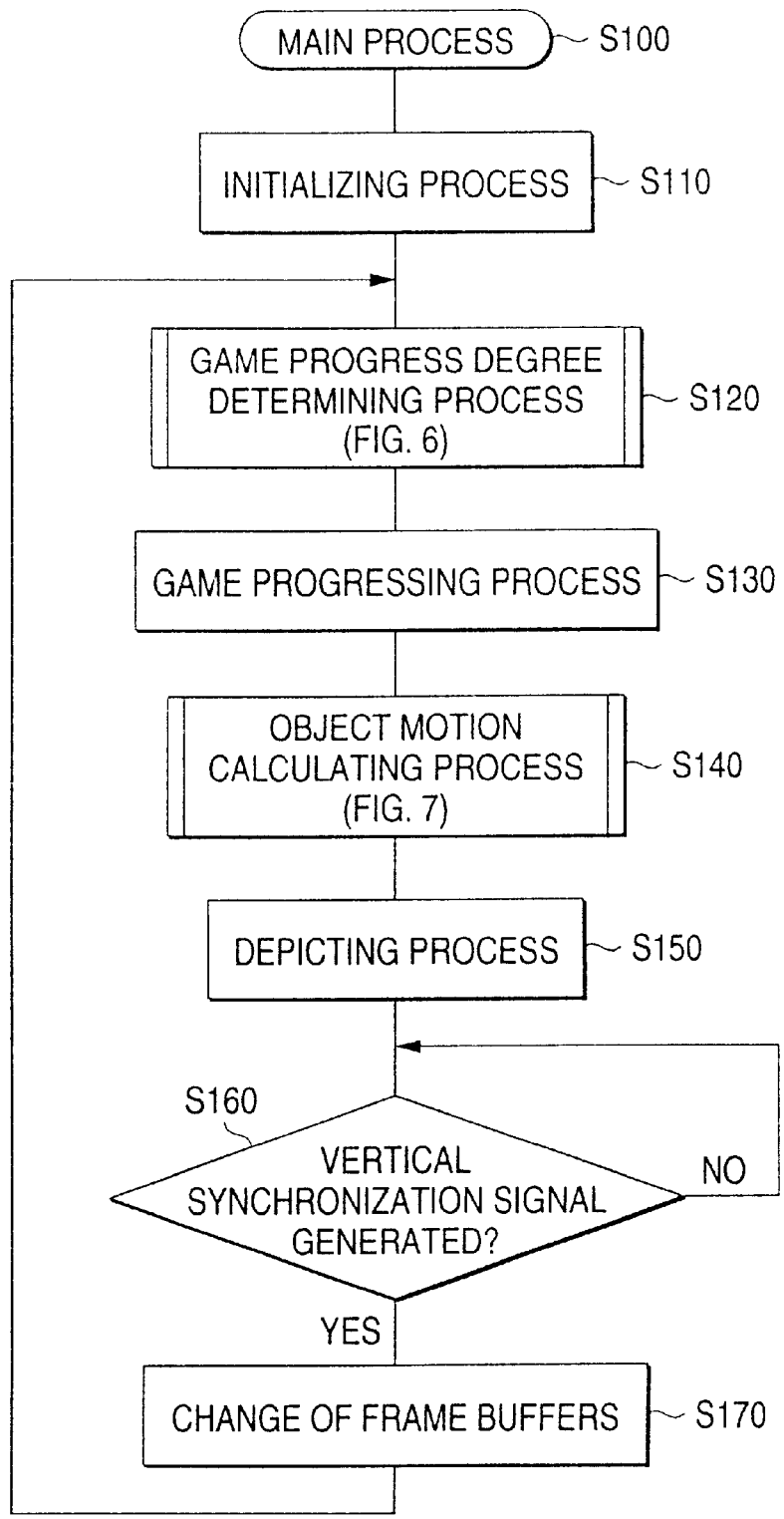
FIG. 5 is a rough flow chart of the main process of a preferable game program which is executed in the game apparatus.

The game programs executed in the present embodiment consist of an initializing process to set the initial data in the RAM 103 and a main process, which controls the progress of the game, generates and expresses the game images on the screen. FIG. 5 shows one example of the main process S100.

First, the initializing process S110 is executed at an adequate timing after execution of the main process S100. And, the initial value 0 is set in the data 92 of image generation commencement time (FIG. 4).

After that, the real time counter 91 is forcedly initialized to 1. The initialization is carried out, awaiting the generation of a new vertical synchronization signal after having initialized the data 92 of image generation commencement time. The initial value 0 of the data 92 of image generation commencement time and the initial value 1 of the real time counter 91 are selected to make the initial value of the data 93 on the game progressing degree determined in the game progressing degree determination progress S120 described later. Therefore, it is possible that the initial values of the data 92 of image generation commencement time and the data 93 on the game progressing degree can be set to another figure.

The main process S100 executes a series of processes described below, in order to generate the respective frame images. Before describing the processes, a description is given of the outline of the principle of the processes of the present embodiment.

It is necessary that the degree of change in position and orientation of the respective objects between the adjacent pair of frame images are determined, depending on the game progress rate. In other words, in order to generate a certain frame image, it is necessary that the position and orientation of a plurality of objects that constitute the frame image are determined on the basis of the position and orientation of the same objects in the immediately preceding frame image and the degree to which the objects must move among the frame images.

The degree of movement of the respective objects in one frame cycle is determined on the basis of the rate of game progression with respect to the respective times in progress of the game program. As a matter of course, it is changed depending on an operation input made by the player whether or not the player's character moves. Further, if any operation input is made by the player, there is a case where the rate of game progression is changed by the game program on the basis of the operation. However, since the game program determines the degree of movement of the respective objects based on an operation input made by the player, it is considered that the game program determines the degree of movement of the respective objects, including the influences provided by an operation input of the player.

If the degree of movement of the respective objects is great, the game will proceed quickly on the display screen. Therefore, it can be said that the degree of movement is a game progressing degree between the respective frame images and the preceding frame image.

Where any one of the times of generation of a plurality of continuous frame images is one frame cycle, the frame images are supplied to the display device one after another at each frame cycle, wherein the respective frame images are changed frame cycle by frame cycle and are displayed. Therefore, if the game progressing degree between the respective frame images and the immediately preceding frame image is equal to the game progressing degree in one frame cycle period estimated by the game program, the game images are changed at a progressing rate estimated by the game program on the display screen. Accordingly, when generating these frame images, the game progressing degrees may be made equal to those estimated by the game program.

On the other hand, in the present embodiment, the synchronization timing of frame-by-frame display is adjusted in compliance with the processing load. For this reason, where the image generation time of a plurality of continuous frame images is of N frame cycles (N is an integer number exceeding 1), the respective frame images are repeatedly supplied to the display device over the N frame cycles until generation of frame images continued thereto is completed, and the frame images are continuously displayed in this period. These frame images are changed at each of the N frame cycles, and displayed on the display screen. Therefore, if the game progressing degree between the respective frame images and the immediately preceding frame image is the game progressing degree in the period of one frame cycle estimated by the game program, the game image is changed by 1/N of the progressing rate estimated by the game program on the display screen.

If the display timing of a frame image whose generation time is long is delayed and the game progressing degree is made N times that estimated by the game program, the game image will change on the display screen at a rate which is the same as that estimated by the game program.

In the present embodiment, the game progressing degree of a plurality of frame images is determined when generating these frame images. In detail, the game progressing degree of the respective frame images is determined when generating the frame images. In further detail, the time of generation of frame images to be generated next is predicted, and the game progressing degree of the frame images is determined on the basis of the predicted value, whereby if frame image rows in which the time of generation is of one frame cycle and frame image rows in which the time of generation is of N frame cycles are mixed, the respective frame image rows can be displayed at the progressing rate estimated by the game programs.

There are many cases where the time of generation of continuous frame images is generally of one frame cycle or N frame cycles. Therefore, in the present embodiment, the time of generation of the frame image is measured when generating the respective frame images, and the time of generation of the immediately preceding frame image measured may be used as the predicted value of the time of generation of the next frame image.

To describe in further detail, in the embodiment, the time during which the respective frame images are displayed depends on the period of generation of the next frame image. Directly speaking, the respective frame images are just commenced to be displayed when a vertical synchronization signal is generated after the frame image is generated and completed, and the display thereof is terminated when another vertical synchronization signal is generated after the next frame image is generated. That is, the respective frame images are displayed while the next frame image is being generated. Therefore, it is highly recommended that the game progressing degree of the respective frame images is determined on the basis of a predicted value of the time of generation of the next frame image.

Generally, it can be assumed that the times of generation of the immediately preceding frame image and those of the next frame image are identical to each other. Therefore, it can be considered that the time of generation of the immediately preceding frame image of the respective frame images is the predicted value of the time of generation of the corresponding frame image, and at the same time, is the predicted value of time of the next frame image. Therefore, in the present embodiment, it can be said not only that the game progressing degree of the corresponding frame is determined by using the predicted value of the time of generation of the respective frame images, but also that the game progressing degree of the corresponding frame is determined by using the predicted value of the time of generation of the next frame image of the respective frame images.

The game progressing degree determination progress 120 is a process which determines the game progressing degree having a frame image to be generated next by predicting the time of generation of a frame image when generating the frame image.

Figure 6:
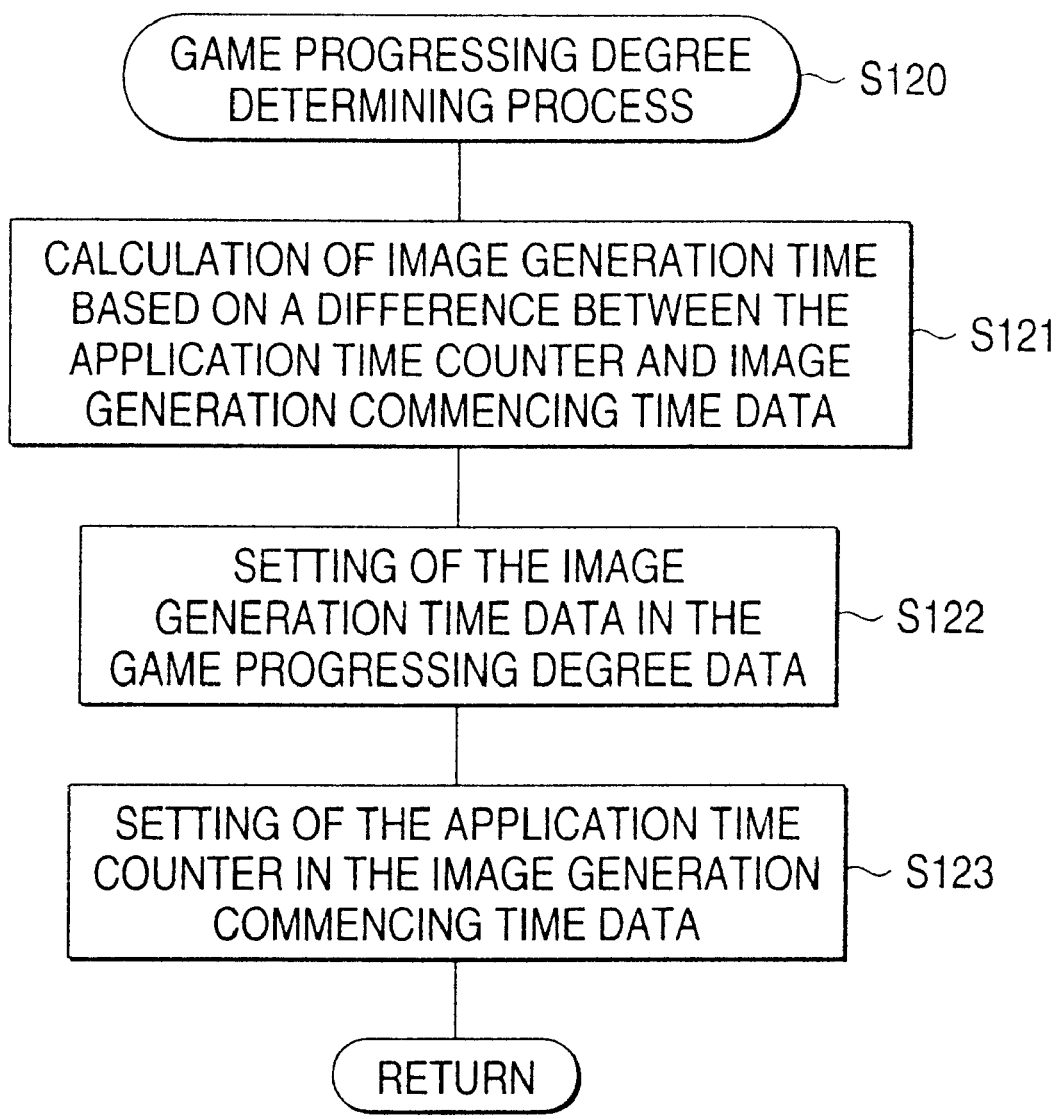
FIG. 6 is a rough flow chart of a game progressing degree determination progress in the main process.

As shown in FIG. 6, in the game progressing degree determination progress S120, a difference between the data 92 of image generation commencement time and the real time counter 91 is first calculated, whereby the time of generation of the immediately preceding frame image is measured (Step S121).

Also, when the game progressing degree determination progress S120 is executed for the first time after commencement of the main process S100, the value of the real time counter 91 and that of the data 92 of image generation commencement time are, respectively, equal to the respective initial values 1 and 0. Therefore, it is assumed that the predicted value of the time of generation of the frame image first generated in the main process S100 is one frame cycle.

The above measured time of generation is set in the data 93 on the game progressing degree (FIG. 4) as it is (Step S122). Therefore, the value of the data 93 on the game progressing degree of the frame image which is first generated becomes 1.

After Step S121, the value of the real time counter 91 is set to the data 92 of the image generation commencement time (Step S123). The value will express the commencement time of the image generation of the current frame image.

As described above, the real time counter 91 counts the number of vertical synchronization signals generated. Therefore, the real time counter 91 counts the real time in terms of frame cycles. Since, in Step S123, the data 92 of image generation commencement time are also determined by using the contents of the real time counter 91, the data expresses the generation commencement time of the next frame image in terms of the frame cycles.

Therefore, the time of generation of the frame image measured in Step S121 is expressed in terms of frame cycle. That is, the measured time of generation will express how many times the frame cycle the time of generation of the immediately preceding frame image corresponds to. The processing load can be judged by the time of generation of the immediately preceding frame image. For example, if the time of generation of the immediately preceding frame image is two times the frame cycle, the processing load which is equivalent to two times the frame images which can be processed in one frame cycle is applied to the game apparatus.

In the present embodiment, the time of generation is used for the data 93 on the game progressing degree as it is. As described below, where the value of the data 93 on the game progressing degree is M (M is an integer number equal to or exceeding 1), the frame images are generated so that the game progressing degree of the frame image to be produced has a game progressing degree in the M frame cycles estimated by one game program. Therefore, it can be said that the value of the data 93 on the game progressing degree indicates how many times the game progressing degree estimated by the game program with respect to the frame image, the game progressing degree of the frame image which is now going to be produced corresponds.

Returning to FIG. 5, next, the game progression process S130 is executed. Herein, the game progress is controlled. In detail, scenes expressing partial flows of the game are changed over. For example, it is judged whether or not a battle is to commence, on the basis of an operation input by a player. When commencing battle, a process for the battle is executed, and the scene related to the process is selected.

Thus, a process is determined to proceed with the game in response to the operation inputs by a user. Hereinafter, the determination process is carried out to generate frame images. That is, the processing load to generate the frame images is determined in response to the operation inputs.

Also, the processing detail for progress of the game is determined in response to the user's operation inputs, and it is determined by how many times the frame images objects to be displayed by the game progressing degree determination progress on a frame screen are actuated, whereby the images to be frame-displayed next are confirmed.

During the execution of the battle, in the game progression process S130, it is judged whether or not the player's character is defeated in the battle with enemy characters. Where it is judged that the player's character is defeated in the battle with the enemy characters, the game over process is carried out in the main process S100. Then, the main process terminates. But, since the detail of judging the defeat of the player's character does not relate to the present invention, it is omitted herein. Also, in FIG. 5, the process pertaining to the termination of the main process S100 when the game is over is not illustrated herein for simplification of the drawing.

The next object motion calculation process S140 and the still next depicting process S150 occupy the major parts of the processes to generate the respective frame images. In the object motion calculation process S140, the position and orientation of the respective objects after the respective objects included in the frame image to be generated next in a series of frame images which constitute a scene selected by the game progression process S130 are determined.

Figure 7:
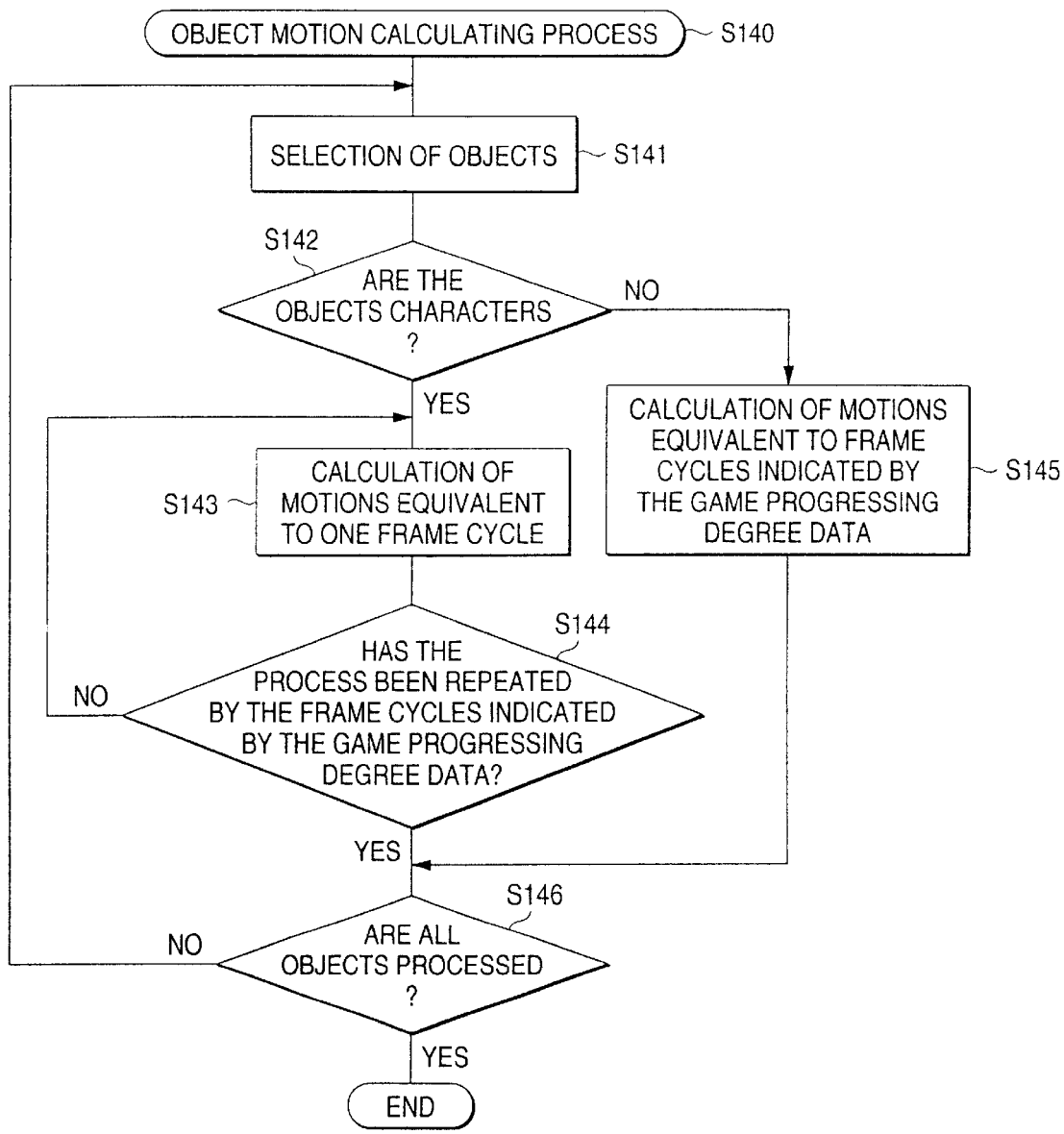
FIG. 7 is a rough flow chart of an object motion calculation process in the main process.

That is, as shown in FIG. 7, reference is made to an object selection table 103h, wherein one of the objects which are not yet selected is selected (Step S141). Further, the "Selection Data" of the object selected in the object selection table 103h is changed to "Already Selected". The object is distinguished by the predetermined reference to distinguish objects (Step S142). In detail, it is distinguished whether the selected object is an object having the potential to make complicated motions, for example, an object expressing a character or an object other than this.

Where the object is not a character object, the value showing the amount of motion of the object equivalent to one frame is multiplied by the value M of the data 93 on the game progressing degree, whereby a process is carried out, which calculates motions of the object in the period of frame cycles whose number is equal to the value of the data 93 on the game progressing degree (Step S145). That is, after the period elapses, the position and orientation in virtual spaces (world spaces) of a plurality of respective polygons which constitute the object, and an object model expressing the object is produced.

Where the object is a character object, a process for calculating the object motions in one frame cycle is carried out (Step S143). That is, after the period elapses, the position and orientation in the virtual space of a plurality of respective polygons which constitute the character object are determined, whereby an object model expressing the character object is produced.

Next, it is judged whether or not the process in Step S143 is to be repeated, equivalent to the number of frame cycles shown by the data 93 on the game progressing degree (Step S144). Unless the process has been repeated a number of times equivalent to the number of frame cycles shown by the data on the game processing degree, the process in Step S143 is repeated a number of times equivalent to the value of the data of the game progressing degree (Step S144). After the process of Step S143 has been repeated a number of times equivalent to the number of frame cycles shown by the data of the game progressing degree, the processing of Step S146 is executed. Thus, after the period of frame cycles equivalent to the value of the data of the game progressing degree elapses, the position and orientation of the respective objects are determined.

Also, where the object is a character object, a reason why the motion calculation process S143 is carried out for each of the frame cycles is that there is a possibility for the motion of the character object to be suddenly changed frame by frame. For example, if the character object is brought into collision with a wall or an obstacle after one frame cycle elapses, the position and orientation of the character will change greatly thereafter. Therefore, the motions of the character object is calculated in each of the frame cycles, the calculations are repeated one after another equivalent to the value of the data of the game progressing degree with respect to the subsequent frame cycles.

Speaking conversely, the judgment in the judgement step S142 is to judge whether or not the object is an object for which the motion calculation must be carried out for each frame cycle. That is, if, in an object other than character objects, there is a possibility that the motion thereof will change greatly in one frame cycle just like a character object, the judgement reference may be changed so that the object is processed as in the character object.

Where it is judged that the abovementioned processes with respect to all the objects are completed with reference to the object selection table 103h (Step S146), the object motion calculation process S140 terminates. At this time, all the columns in the "Selection Data" of the object selection table 103h are changed to "Not Selected". Thus, after processes elapse equivalent to all the frame cycles corresponding to the number shown by the data 93 on the game progressing degree, the positions and orientations of all the polygons constituting the respective objects are determined. On the other hand, if it is judged that there remains any object, which is not processed, in the process of Step S146, the process advances to Step S141.

Returning to FIG. 5, in the next depicting process S150, on the basis of the positions and orientation which are determined in the object motion calculation process S140 with respect to all the polygons of the respective objects which constitute a frame image to be generated, image data to display these polygons on the display screen are produced, and are stored one after another in a frame buffer (not illustrated) secured in the graphic processing unit 104.

By executing the depicting process S150, the final frame image is produced in the case where frame images equivalent to the number shown by the data 93 on the game progressing degree are generated. This indicates that generation of frame images which had to be displayed in synchronization with reference signals for which no synchronization timing is secured with respect to the frame display is omitted. Also, in the present embodiment, the number of reference signals for which no synchronization timing is secured with respect to the frame display is a presumed value based on the time of generation of the immediately preceding frame image.

That is, a rendering process such as clairvoyance conversion, etc., is executed on each of a plurality of polygons which constitute the object model produced with respect to the respective objects, wherein the shape and positions, on the display screen, of the plurality of polygons constituting the abovementioned object model are determined so as to express an object figure expressed on the display screen of a display device. Also, a texture mapping process is carried out with the object model, wherein colors and patterns are assigned to the respective faces of the plurality of polygons which constitute the object.

Thus, figure data are produced with respect to the polygons which constitute the object model. The abovementioned processes are carried out one after another for the respective different polygons that constitute one of a plurality of objects constituting a display screen. That is, the same processes are executed with respect to the different objects by turns. Thus, the frame image expressing all the objects is produced.

During the generation of the frame image, the image to be displayed is not changed over even though a vertical synchronization signal is input. In other words, no synchronization timing is secured of the frame display with respect to the vertical synchronization signals during the generation of the frame image. That is, a processing load to generate the frame image is subsequently judged on the basis of whether or not the frame image determined in response to an operation input is being generated. Further, the frame image to be generated is determined in response to the value of the data of the game progressing degree. This indicates that generation of an image to be frame-displayed by a vertical synchronization signal for which no synchronization timing is secured is omitted.

A frame buffer secured in the graphic processing unit 104 (FIG. 1) consists of a pair of frame buffers A and B (not illustrated), and the image data of a plurality of objects that constitute one frame image generated in the depicting process S150 are stored one after another in one of the pair of the frame buffers.

After one frame image is generated, generation of a vertical synchronization signal is awaited by the display device 20 (FIG. 1) (Step S160). Thereafter, when a vertical synchronization signal is generated, the frame buffer is changed from one to the other (Step S170). That is, the other frame buffer of the pair of frame buffers is selected as the frame buffer in which the next frame image is stored. On the other hand, unless generation of the vertical synchronization signal is detected, the process of Step S160 is repeated until the generation is detected.

In Step S160, by awaiting the generation of the first vertical synchronization signal after the frame image is generated, the synchronization timing between the vertical synchronization signal and frame display is adjusted. With which vertical synchronization signal the frame display is synchronized may change based on when the generation of the frame image terminates. That is, the synchronization timing between a reference signal and a frame display is adjusted on the basis of the processing load to generate the frame image.

Also, since a changeover process of the frame buffers which becomes an object to be displayed is carried out in Step S170, the frame display process regarding one frame image is completed. Also, the frame display process referred to herein includes the respective processes from a process for determining the game progressing degree in Step S120 to the depicting process in Step S150 with respect to the generation of a frame image.

The graphic processing unit 104 sends the frame image newly stored in the abovementioned one frame buffer to the display device 20 in synchronization with generation of a vertical synchronization signal after the generation of the abovementioned frame image is completed, and displays it on the display screen.

Hereinafter, the processes from the game progressing degree determination progress Step S120 to the frame buffer changeover process Step S170 are repeated, and subsequent frame images are generated one after another as described above.

That is, when the game progressing degree determination progress S120 is repeated, as shown in FIG. 6, a difference between the value of the real time counter 91 and the value of the image generation commencement time data 92 is calculated in Step S121. The difference expresses, in terms of frame cycles the period from the time when the vertical synchronization signal immediately before the generation commencement of the frame image whose generation is completed is produced to the time when the first vertical synchronization signal immediately after the completion of generation of the frame image is generated. It can be said that the period expresses the time of generation of a frame image. Therefore, the abovementioned difference will express the time of generation of frame images in terms of frame cycle.

The time of generation of a frame image is set as it is in the data 93 on the game progressing degree. In the object motion calculation process S140, the data 93 on the game progressing degree is used, by the method already described above, as the data expressing the degree of progress of the frame image when generating the next frame image. Further, the value of the real time counter 91 is set to the data 92 of the image generation commencement time. The data 92 of the image generation commencement time after the renewal will express, in terms of frame cycle, the generation commencement time of the next frame image.

Thereafter, as described previously, the image data expressing the corresponding next frame image are stored in the other of the pair of frame buffers in the game progression process S130, object motion calculation process S140 and depicting process S150.

The abovementioned processes are further carried out for a series of subsequent frame images one after another. A series of image data expressing those frame images are alternately stored in a pair of frame buffers.

In parallel to the generation of such new frame images, the frame image most recently stored in the other frame buffer, which differs from the frame buffer storing the frame images now being generated, is displayed by the display device 20. In the case where the time of generation of the frame image to be displayed next is equal to a plurality of frame cycles, the graphic processing unit 104 supplies, midway of the period, the same frame image as that displayed in synchronization with a vertical synchronization signal, wherein the same frame image will be continuously displayed.

Therefore, in the case where a plurality of frame images whose time of generation is equal to N frame cycles (N is an integer number exceeding 1) are continued, the display of those frame images are substantially changed over once every N frame cycles. As described above, in the present embodiment, the game progressing degrees of these frame images is determined so that it becomes N times the game progressing degree estimated by the game program. Accordingly, the game progresses at the progress rate estimated by the game program on the display screen.

Figure 8:
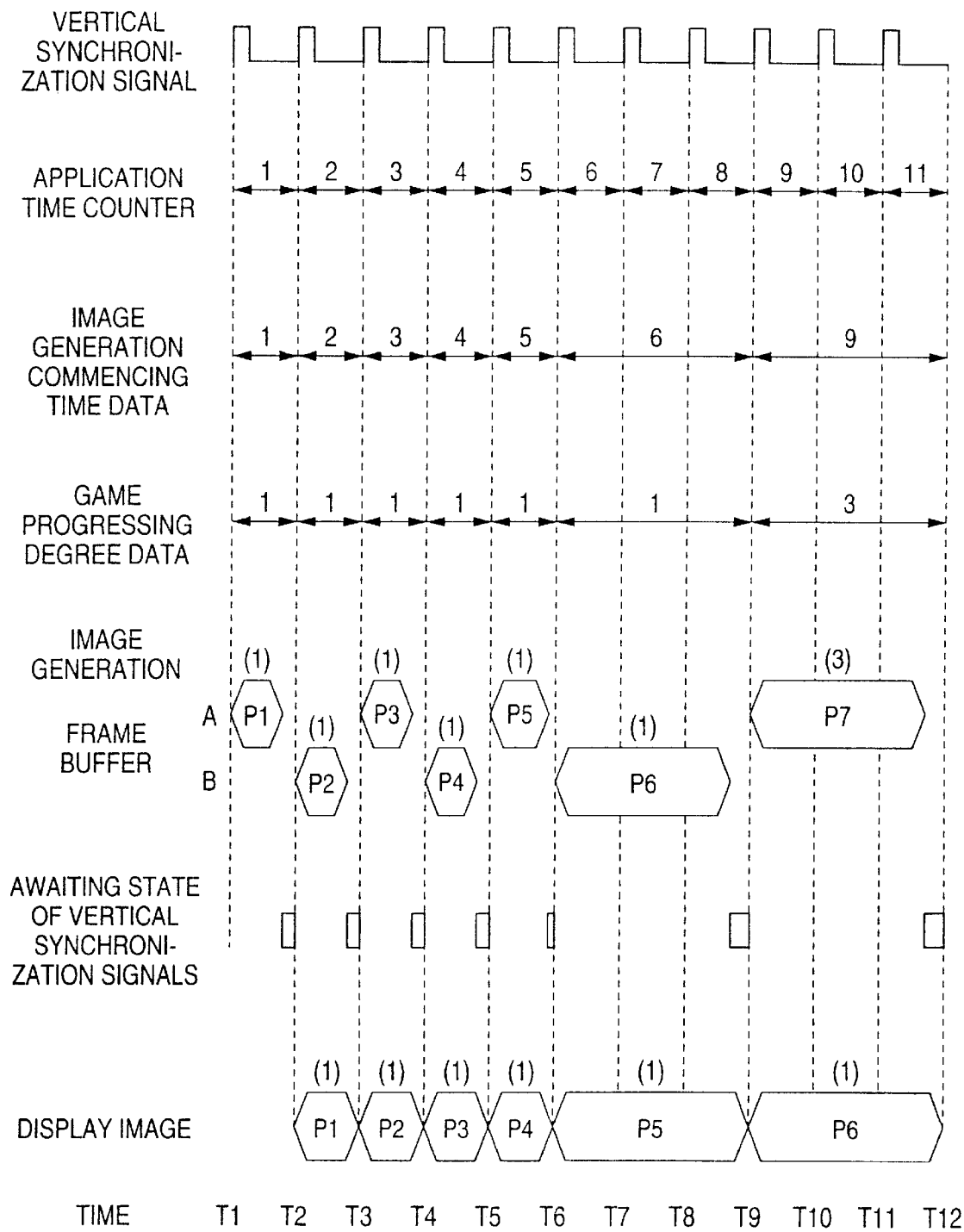
FIG. 8 is a front half section of a timing chart used to explain timings of generation and display of frame images by the main process.

A further detailed description is given of changes of the frame images generated and displayed through the abovementioned processes, using timing charts of several signals shown in FIG. 8 and FIG. 9.

In these drawings, P1, P2, etc., show examples of the frame depicting process S150. The period of generating frame images P1, P2, etc., are shown, corresponding to the frame buffers A or B in which the respective frame images are stored. Figures shown on the duration of generation of the respective frame images with a bracket indicate values of the data 93 pertaining to the game progressing degree used for the generation of the frame images.

On the other hand, the period of display of the respective frame images on the display device 20 are arranged on the same line regardless of the frame buffers from which the frame images are read. Figures shown on the display period of the respective frame images with a bracket indicate values of the data 93 pertaining to the game progressing degree used in the generation of the frame images.

In FIG. 8, it is assumed that the data 92 of the image generation commencement time (FIG. 4) are initialized to 0 by the initial setting process S110 before time T1, and the real time counter 91 (FIG. 4) is set to the initial value 1 in response to the vertical synchronization signal generated at time T1. Also, thereafter, a difference between the value 1 of the real time counter 91 and the value 0 of the data 92 of the image generation commencement time is calculated by the game progressing degree determination process S120. The difference expresses the time of generation of a preceding frame image, in this case, the value becomes 1. The value is determined as the initial value of the data 93 on the game progressing degree.

After that, the progress of a game is controlled by the game progression process S130, and the motions of all the objects constituting the first frame image P1 are calculated in compliance with the value 1 of the data 93 on the game progressing degree in the object motion calculation process S140. Based on the results thereof, the image data expressing the first frame image P1 is stored in one frame buffer A by the depicting processing S150.

Herein, it is assumed that the time for generating the first frame image P1 is within one frame time. Therefore, the frame image P1 is completely generated before time T2 at which the next vertical synchronization signal is generated, and a signal awaiting a vertical synchronization signal is set by Step S160. When a new vertical synchronization signal is generated at time T2, the frame buffer changeover process Step S170 is executed, and the frame buffer in which a frame image to be generated next is stored is changed over to the other frame buffer B.

Thereafter, the game progressing degree determination progress S120 is executed before the next frame image P2 is generated, both the real time counter 91 and the data 92 of the image generation commencement time are renewed to 2. Although the data 93 on the time progressing degree is also renewed, the value remains at 1 as it is. Thus, it is determined that the next frame image P2 should be generated as in the frame image P1 on the basis of the value 1 pertaining to the data 93 on the game progressing degree.

Herein, it is assumed that the time of generation of the frame image P2 is within one frame time. Therefore, the value of the data 93 pertaining to the game progressing degree with respect to the next frame image P3 remains 1 as it is. As in the above, it is assumed that frame images P3, P4 and P5 are generated on the basis of the value 1 of the data 93 on the game progressing degree.

Therefore, a signal awaiting vertical synchronization signals is set before the respective times T3, T4 and T5, and when a vertical synchronization signal is generated at the respective times T3, T4, and T5, the real time counter 91 is gradually renewed to be 3, 4 and 5 while the data 92 of the image generation commencement time are gradually renewed to be like 3, 4 and 5. However, although the data 93 on the game progressing degree are renewed at the respective times, the value thereof remains at 1 as it is.

Thus, the frame images P2, P3, P4, and P5 are gradually stored in the frame buffers B, A, B and A. Since the frame image P1 is completely generated at time T2, the frame image P1 is displayed from time T2. And, frame image P3 is displayed from time T3. As well, frame images P3, P4 and P5 are, respectively, displayed from times T4, T5 and T6.

It is understood from the drawing that the display from the frame image P1 through P5 is changed over once in each frame cycle. Thus, in the case where frame images in which the data 93 in the game progressing degree is 1 are continued, as in the conventional examples, the respective frame images are displayed in only one frame cycle. Therefore, these images express the game at the game progression rate estimated by the game program.

It is assumed that frame image P6 whose generation is commenced at time T6 requires three frame cycles for the generation. Therefore, the image P6 is completed for the duration from time T8 through time T9. The frame buffer in which the image P6 is stored is the frame buffer B. A signal awaiting a vertical synchronization signal is generated before time T9, wherein, when the vertical synchronization signal is generated at time T9, the frame buffer is changed over. The data of the game progressing degree with respect to the next frame image P7 is changed to a value 3. The frame image P7 is thus generated so as to have three times the game progressing degree.

It is normal that once a frame image requiring a long image generation period appears in a video game, several frame images coming after that also require the same period. Herein, it is assumed that the subsequent frame image P7 and frame images P8 and P9, both shown in FIG. 9, require three frame cycles for the generation thereof. As shown in FIG. 9, frame images P8, P9, and P10 are generated so as to have three times the game progressing degree as in the frame image P7, at the respective times from T12 to T15, T15 to T17 and T17 to T19.

As shown in FIG. 9, since frame images P7 through P9 having three times the game progressing degree are, respectively, displayed for the period of three frame cycles from times T12 displayed to T14, from T14 to T16 and from T16 to T18, these frame images will express a game at the game progression rate estimated by the game program. Thus, in the present embodiment, the game progressing degree of the frame images P7 to P9 in which the image generation period is three frame cycles, appearing subsequent to the frame images P1 through P4 in which the image generation period is one frame cycle, can be generated so as to be displayed at the game progression rate estimated by the game program.

Also, although the frame image P5 is generated by using the value 1 of the data 93 pertaining to the game progressing degree, three frame cycles are required to generate the next frame image P6. Therefore, the frame image P5 is displayed for the period of three frame cycles from time T6 to time T8. Accordingly, in this period, the game progression rate of a game on the display screen is lowered to one-third of that estimated by the game program.

Further, although the frame image P6 is generated by using the value 1 of the data 93 pertaining to the game progressing degree, three frame cycles are required to generate the next frame image P7. For this reason, the frame image P6 is displayed in the period of three frame cycles from time T9 through time T11.

When frame image rows P11, P12, P13, . . . generated after the frame-image P10 is generated require one frame cycle for the generation, as has been made clear in the above description, the frame image P11 is generated so as to have three times the game progressing degree while the frame images P12, P13, . . . are generated so as to have one time the game progressing degree. Therefore, as has been made clear in FIG. 9, frame images coming after the frame image P12 are displayed in only one frame cycle, and these frame images will express a game at the game progression rate estimated by the game program.

The frame image P10 is generated by using the value 3 of the data 93 pertaining to the game progressing degree. However, the duration of generation of the next frame image P11 is one frame cycle. Therefore, the frame image P10 is displayed in only one frame cycle from time T21 to time T22. Accordingly, in this period, the game progression rate on the display screen is increased to three times that estimated by the game program.

The frame image P11 is generated by using the value 3 of the data 93 pertaining to the game progressing degree. However, the duration of generation of the next frame image P12 is one frame cycle. Therefore, the frame image P11 is displayed in only one frame cycle from time T22 to time T23.

Thus, since frame display is carried out in synchronization with the first reference signal after the frame image is generated, it is possible to change over the frame display at a frame changeover timing responsive to the time of generation of frame images even though the processing load is changed. Therefore, in a scene where the processing load is slight, the frame-by-frame display can be changed in a short cycle, whereby a clear display image can be obtained. Also, even though the processing load becomes heavy, the changeover timing of frame-by-frame display is delayed to be equivalent to an increase in the processing load, whereby no incomplete frame image is displayed.

Figure 10A:
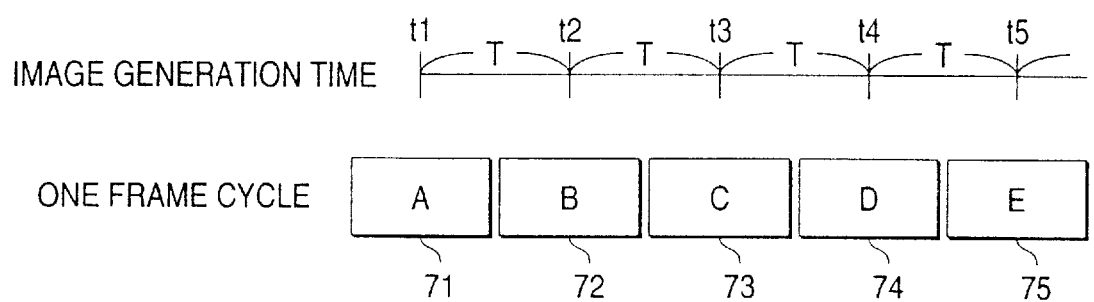
FIG. 10A is an exemplary view showing changes in images displayed wherein the time of generation is of one frame cycle.
Figure 10B:
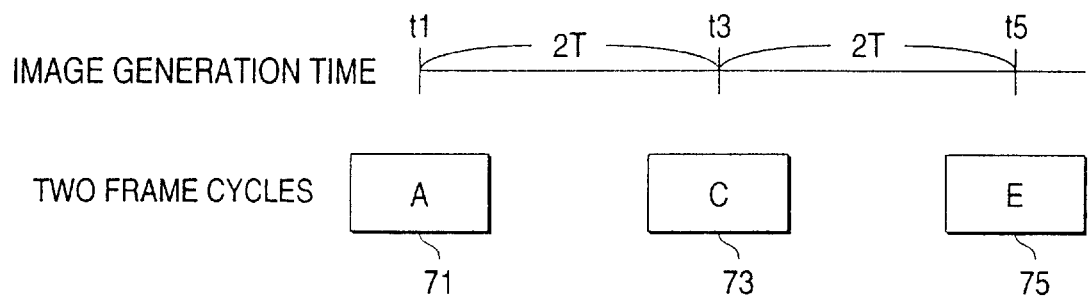
FIG. 10B is an exemplary view showing changes in images displayed wherein the time of generation is of two frame cycles.

FIG. 10A and FIG. 10B illustrate changes in the display screen, which are illustrated by the abovementioned embodiment. In FIG. 10A and FIG. 10B, T indicates a frame cycle(s), and images 71, 72, 73, 74, and 75 indicate a plurality of images to be displayed one after another. Also, in FIG. 10A and FIG. 10B, the displayed images are expressed by using a letter "A", "B", "C", "D" or "E" In fact, game images including characters are displayed.

FIG. 10A shows a transition of images in the case where the time of generation of a group of images to be displayed one after another is one frame cycle. In this drawing, one frame cycle is expressed in terms of T (T is a positive real number), and one frame cycle (T) is, for example, ⅟60 of a second. As shown by the illustrated image row, when "A" image 71 is generated and displayed at time t1, "B" image 72 is generated in parallel to the display of the image 71. At time t2 after the "A" image 71 is displayed in one frame cycle (T), "B" image 72 is displayed. As well, "C" image 73, "D" image 74, and "E" image 75 are displayed in one frame cycle one after another. That is, "IC" image 73 is displayed at time t3, "D" image 74 is displayed at time t4, and "E" image 75 is displayed at time t5.

On the other hand, FIG. 10B shows the transition of images in the case where the time of generation of the respective images is two frame cycles. In the drawing, two frame cycles are expressed in terms of (2T), wherein (2T) is two times (T). In FIG. 10B, it is assumed that "A" image 71 is displayed at time t1. As shown by the image row illustrated therein, when the next image is generated in parallel to the display of the image 71, the game progressing degree is determined so that "C" image 73 to be displayed after elapse of two frame cycles (2T) is produced as the next image since the time of generation of the respective images is two frame cycles (2T).

Therefore, the "C" image 73 is displayed at time t3 after the elapse of two frame cycles from time t1, and "E" image 75 is displayed at time t5 as well. Thus, even in the case where the time of generation of a series of images is of two frame cycles, the change rate of the images on the display screen will become the same as that in the case where the time of generation of the respective images is of one frame cycle.

Further, although not illustrated in FIG. 8 and FIG. 9, where a series of frame images for which the time of generation is of two frame cycles are mixed in a group of frame images to be generated, these frame images are generated by the process shown in FIG. 5 so that the respective game progressing degrees become 2, and these frame images are displayed with the images changed over substantially once every two frame cycles. Therefore, in the case of these frame images, the game progression rate appearing on the display screen becomes the same as estimated by the game program.

Embodiment 2

In the first embodiment, the ratio of the time of generation of a frame image to the frame cycle is calculated when having generated the respective frame images, and the ratio is used, as it is, as the ratio of the time of generation of the next frame image to the frame cycle. The method utilizes the fact that there are many cases where the abovementioned ratios of actually continuous frame images are identical to each other. However, without calculating the abovementioned ratios of the respective frame images as described above, the game progressing degree of the respective frame images can be determined when generating the frame images.

As already described, the time of generation of a frame image is the time required to gradually generate a plurality of objects included in the frame image. Therefore, instead of measuring the time to generate all the object images, a method for predicting the processing load to generate these images may be used.

The processing load to generate a frame image greatly depends on the number of objects included in the frame image and the total number of polygons constituting the respective objects. Therefore, the total number of polygons of objects used to generate the frame image to be generated next is calculated between the game progression process S130 and the object motion calculation process S140, which are already described. It is judged whether or not the respective polygons or respective objects move, and a process for predicting the processing load to generate the frame image may be carried out on the basis of the results of calculation and judgement.

The limit of the processing load to generate a frame image in one frame cycle is determined in advance, and the ratio of the predicted processing load to the limit value is calculated, whereby the result of calculation may be used as the ratio of the time of generation of the frame image to the frame cycle. Also, in the second embodiment, it is not necessary that the preceding initial setting process S110 and game progressing degree determination progress S120 are carried out.

As already described with reference to the first embodiment, in the case where the time of generation of the immediately preceding frame image is used as a predicted value of the time of generation of the next frame image, there may be cases where the predicted value differs from the real time of generation of the corresponding frame image. Consequently, when the frame image is displayed on the display screen, the game progression rate brought about by the frame image differs from that estimated by the game program. In the second embodiment, since the time of generation of respective frame images is predicted on the basis of the contents of the frame images, such an error in prediction will not occur. Therefore, it is possible to eliminate anything abnormal in the game progression rate, resulting from errors in prediction.

As has been made clear from some embodiments specified herein, in the invention, when a series of frame images to display a game are generated, the processing load is judged, and a changeover timing of the frame display is adjusted. Also, the game progressing degree of these frame images is determined in response to the processing load. The contents of the frame images may change according to the progress of the game. Therefore, by the invention, even though the processing load becomes excessive, the display screen can be freed from any flickering. Further, since the game progressing degree of these frame images can be dynamically determined during the execution of the game, it is possible to determine an adequate game progressing degree.

In addition, the present invention is not limited to the abovementioned two embodiments. It is needless to say that these embodiments may be subjected to various modifications and/or variations without departing from the spirit of the invention.

For example, in the abovementioned embodiments, the game progressing degree of a frame image was determined for each of a plurality of frame images when generating the frame image. However, in the invention, when a plurality of frame images are generated, the game progressing degree which each of those frame images must have may be determined. That is, it is not necessary to determine the game progressing degree for each frame image. For example, a plurality of frame images to be generated are divided into a plurality of groups of frame images, wherein a game progressing degree common to all the frame images in a specified group may be decided group by group or, a plurality of frame images to be generated are divided into plural groups in advance, and the abovementioned game progressing degrees may be determined with respect to the frame image groups In the first embodiment, the time of generation of the respective frame images was calculated by counting the number of vertical synchronization signals generated during the generation of frame images. But, other clock signals provided in a computer may be used therefor. In this case, a process to obtain a ratio of the time of generation of respective frame images and one frame cycle is generally required.

Prediction of the processing load F or generation of frame images, which is shown in the second embodiment, is enabled by further detailed calculations or other more simplified calculations.

With respect to game programs to which a technology of reducing the processing load to generate frame images is applied, it is possible to use the technology in combination with the invention.

That is, when the generation process of a frame image is reduced by not generating insignificant objects which corresponds to a part of the frame image or by simplifying the generation process of the objects, and at the same time the frame image for which the generation process is reduced has the time of generation exceeding one frame cycle, the game progressing degree of the frame image may be determined by utilizing the invention. According to the method, since it is possible to decrease the maximum value of the time of generation of the frame image, the period of continuously displaying the same frame image or the maximum value may be shortened, whereby the flickering of the display screen can be reduced.

That is, a computer which constitutes a game apparatus shown in the abovementioned embodiments of the invention may be provided with a logic circuit to execute some of the features or functions of a game program used therein. Further, in line therewith, the game program may be modified so as to change the sequence of execution of the features or functions of the game program used therein.

In the abovementioned embodiments of the invention, an input device and a display device are provided separately from the game apparatus. However, either of the input device or display device or both may be constructed integral with [the with] the game apparatus. Further, a recording medium is not required to be detachable and attachable, but it may be non-detachably incorporated in the game apparatus.

A recording medium according to the invention or a recording medium used for a game apparatus is not limited to a CD-ROM. It may be a recording medium readable by a computer, for example, DVD, magnetic type recording medium, a semiconductor memory or other optical recording medium may be available.

In the abovementioned embodiments, a household game apparatus was used as a platform. But, a game apparatus according to the invention may use a universal computer such as a personal computer or an arcade game machine as the platform. Also, communication terminals such as a portable telephone, a portable information terminal, and a car navigation system may be utilized as the platform.

Although the invention has been described with reference to particular means, materials and embodiments, it is to be understood that the invention is not limited to the particulars disclosed and extends to all equivalents within the scope of the claims.

What is claimed is:

1. A recording medium readable by a computer, storing programs to execute frame-by-frame display in synchronization with reference signals generated in a fixed cycle, wherein said programs cause said computer:

to judge a processing load in response to an operation input;

to dynamically adjust synchronization timing between the reference signals generated at said fixed cycle and frame-by-frame display in response to said judged processing load, an adjustment amount always varying by an amount directly related to a variation amount of the judged processing load; and to execute frame-by-frame display at said adjusted synchronization timing.

2. A recording medium as set forth in claim 1, wherein in execution of frame-by-frame display, an image to be frame-displayed at said adjusted synchronization timing is generated.

3. A recording medium as set forth in claim 1, wherein in execution of frame-by-frame display, if any reference signal for which no synchronization timing has been secured exists, generation of an image to be frame-displayed by said corresponding reference signal is omitted.

4. A recording medium readable by a computer, in which programs for a video game executed by said computer are stored, wherein said programs cause said computer:

to sequentially generate a plurality of frame images constituting a video game;

to display said generated plurality of frame images by changing the same;

to predict a time of generation of the frame images when said frame images are generated;

to determine a degree of progress to be advanced by said frame images, depending on the time of generation of the predicted frame images; and to select a next frame image to synchronize with the determined degree of progress.

5. A recording medium as set forth in claim 4, wherein the predicted generation time comprises a time expressed by using as the unit a frame image display cycle as the minimum display changeover duration of said plurality of displayed frame images.

6. A recording medium readable by a computer, in which programs for a video game executed by said computer are stored, wherein said programs cause said computer:
- to sequentially generate a plurality of frame images constituting a video game;
- to display said plurality of generated frame images by changing the same;
- to measure a time of generation of an immediately preceding frame image when the preceding frame image is generated; and
- to determine a degree of progress of a game to be advanced by the corresponding frame images, depending on the time of generation of said immediately preceding measured frame image; and
- to select a next frame image to synchronize with the determined degree of game progress.

7. A recording medium readable by a computer, in which programs for a video game executed by said computer are stored, wherein said programs cause said computer:
- to sequentially generate a plurality of frame images constituting a video game in synchronization with completion of generation of the frame image preceding the generated frame images;
- to display said plurality of generated frame images so as to change over and display said plurality of generated frame images in synchronization with appointed clock signals having a frame image display cycle being the minimum duration of changing over display of said plurality of frame images, after the completion of generation of each of said plurality of frame images;
- to predict a time of generation of the frame images when said plurality of frame images are generated;
- to determine a degree of progress of a game to be advanced by the frame images, depending on the time of generation of said predicted frame images; and
- to select a next frame image to synchronize with the determined degree of game progress.

8. A recording medium as set forth in claim 7, wherein in generation of frame images, the next frame image is generated in synchronization with said clock signal after the completion of said plurality of respective frame images.

9. A game displaying method for executing frame-by-frame display in-synchronization with reference signals generated at a fixed cycle, comprising:
- judging a processing load in response to an operating input;
- dynamically adjusting a synchronization timing between the reference signals generated at said fixed cycle and the frame-by-frame display in response with a judged processing load, an adjustment amount always varying by an amount directly related to an amount the judged processing load varies; and
- executing frame-by-frame display at said adjusted synchronization timing.

10. A game displaying method as set forth in claim 9, wherein said frame-by-frame display executing generates an image to be frame-displayed at the adjusted synchronization timing.

11. A game displaying method as set forth in claim 9, wherein said frame-by-frame executing omits generation of an image to be frame-displayed by a reference signal where the reference signal for which an adjusted synchronization timing is not secured.

12. A game display method comprising:
- sequentially generating a plurality of frame images constituting a video game;
- displaying a plurality of generated frame images by changing over said plurality of frame images;
- predicting a time of generation of the frame images when said frame images are generated;
- determining a degree of progress of a game to be advanced by the frame images, depending on the time of generation of the predicted frame images; and
- selecting a next frame image to synchronize with the determined degree of progress.

13. A game display method comprising:
- sequentially generating a plurality of frame images constituting a video game;
- displaying a plurality of generated frame images by changing over said plurality of frame images;
- measuring a time of generation of an immediately preceding frame image when the immediately preceding frame image is generated;
- determining a degree of progress of a game to be advanced by the corresponding frame image, depending on the time of generation of the immediately preceding frame image; and
- selecting a next frame image to synchronize with the determined degree of game progress.

14. A game display method, comprising:
- sequentially generating a plurality of frame images, which constitute a video game, in synchronization with the completion of generation of frame images preceding the generated frame images;
- displaying a plurality of generated frame images so that said plurality of generated frame images are changed over and displayed in synchronization with appointed clock signals having a frame image display cycle being the minimum duration of display changeover of said plurality of frame images after the completion of generation of each of said plurality of respective frame images;
- predicting a time of generation of the frame images when said frame images are generated;
- determining a game progressing degree to be advanced by the frame images, depending on the time of generation of the corresponding predicted frame images; and
- selecting a next frame image to synchronize with the determined degree of game progress.

15. A game display apparatus for executing frame-by-frame display in synchronization with a reference signal generated at a fixed cycle, comprising:
- a system that judges a processing load in response to an operating input;
- a system that dynamically adjusts the synchronization timing with the reference signal generated at said fixed cycle and frame-by-frame display, in response to the processing load judged by said judging system, an adjustment amount always varying by an amount directly related to an amount the judged processing load varies; and
- a system that executes frame-by-frame display at the adjusted synchronized timing.

16. A game display apparatus as set forth in claim 15, wherein said executing system generates an image to be frame-displayed at the synchronized timing adjusted by said adjusting system.

17. A game display apparatus as set forth in claim 15, wherein said executing system omits generation of an image to be frame-displayed by said reference signal where there is a reference signal for which the synchronization timing is not secured by said adjusting system.

18. A game display apparatus, comprising:
- a generator that sequentially generates a plurality of frame images which constitute a video game, in synchronization with completion of generation of frame images preceding the respective frame images;
- a display that displays said plurality of frame images generated by generator so that said plurality of generated frame images are changed over and displayed in synchronization with appointed clock signals having a frame image display cycle being the minimum duration of display changeover of said plurality of frame images after the completion of generation of each of said plurality of frame images;
- a predicting system that predicts a time of generation of the frame images when said plurality of frame images are generated;
- a determining system that determines a game progressing degree to be advanced by the frame images, depending on the time of generation of the predicted frame images; and
- a selecter that selects a next frame image to synchronize with the determined degree of game progress.

* * * * *